United States Patent
Nishida et al.

(10) Patent No.: US 7,619,684 B2
(45) Date of Patent: Nov. 17, 2009

(54) CAMERA MODULE, MANUFACTURING METHOD OF CAMERA MODULE, ELECTRONIC APPARATUS, AND MANUFACTURING METHOD OF ELECTRONIC APPARATUS

(75) Inventors: Katsuitsu Nishida, Souraku-gun Kyoto (JP); Tohru Shigeta, Nara (JP); Hidetoshi Nishimura, Nara (JP); Yoshinori Tanida, Tenri (JP); Naoki Sekiguchi, Yokohama (JP); Morimasa Yoshie, Shiki (JP)

(73) Assignees: Sharp Kabushiki Kaisha, Osaka (JP); Shicoh Engineering Co., Ltd., Yamato (JP)

( * ) Notice: Subject to any disclaimer, the term of this patent is extended or adjusted under 35 U.S.C. 154(b) by 636 days.

(21) Appl. No.: 11/003,340

(22) Filed: Dec. 6, 2004

(65) Prior Publication Data

US 2005/0129384 A1 Jun. 16, 2005

(30) Foreign Application Priority Data

Dec. 11, 2003 (JP) .............................. 2003-413975

(51) Int. Cl.
*H04N 5/225* (2006.01)
*H04N 5/228* (2006.01)
*H04N 5/232* (2006.01)
*G02B 7/02* (2006.01)

(52) U.S. Cl. .................. 348/374; 348/208.11; 348/335; 348/357; 359/813; 359/814; 359/822; 359/823; 359/824

(58) Field of Classification Search ................. 348/373, 348/374, 335, 340, 345, 357, 375, 376, 208.11; 359/819, 822, 823, 824, 813, 814
See application file for complete search history.

(56) References Cited

U.S. PATENT DOCUMENTS

| 6,654,064 | B2 * | 11/2003 | Ishikawa ..................... 348/374 |
| 7,088,397 | B1 * | 8/2006 | Hunter et al. ................ 348/374 |
| 7,092,031 | B1 * | 8/2006 | Wiedemann ................. 348/374 |
| 7,113,351 | B2 * | 9/2006 | Hovanky ..................... 359/824 |
| 7,161,621 | B2 * | 1/2007 | Kai et al. ............... 348/208.11 |
| 7,180,546 | B2 * | 2/2007 | Kobayashi ................... 348/374 |
| 2002/0057468 | A1 * | 5/2002 | Segawa et al. .............. 358/509 |
| 2002/0131782 | A1 | 9/2002 | Yamaguchi et al. |
| 2004/0094825 | A1 | 5/2004 | Onishi et al. |
| 2004/0109079 | A1 * | 6/2004 | Fujimoto et al. ............ 348/340 |

FOREIGN PATENT DOCUMENTS

JP 11-295576 10/1999
JP 2002-223378 A 8/2002

(Continued)

*Primary Examiner*—David L Ometz
*Assistant Examiner*—Peter Chon
(74) *Attorney, Agent, or Firm*—Nixon & Vanderhye P.C.

(57) ABSTRACT

An optical structure is disposed on a surface of a device substrate, and a lens system for introducing external light into a solid-state image pickup device is placed in the center of the optical structure. The outer shape of the optical structure seen from the light incident side of the lens system is rectangular, and its plane shape forms a rectangular frame section. An intermediate structure is disposed between the device substrate and the optical structure. The intermediate structure has a fitting section for fitting the optical structure in a part of side faces of the frame section.

24 Claims, 9 Drawing Sheets

FOREIGN PATENT DOCUMENTS

| | | |
|---|---|---|
| JP | 2003-75712 | 3/2003 |
| JP | 2003-078077 A | 3/2003 |
| JP | 2003-110892 A | 4/2003 |
| JP | 2003-319268 A | 11/2003 |
| JP | 2003-348395 A | 12/2003 |
| KR | 2002-0052155 A | 7/2002 |

* cited by examiner

CAMERA MODULE, MANUFACTURING METHOD OF CAMERA MODULE, ELECTRONIC APPARATUS, AND MANUFACTURING METHOD OF ELECTRONIC APPARATUS

CROSS-REFERENCE TO RELATED APPLICATION

This non-provisional application claims priority under 35 U.S.C. §119(a) on Patent Application No. 2003-413975 filed in Japan on Dec. 11, 2003, the entire contents of which are hereby incorporated by reference.

BACKGROUND

The technology presented herein relates to a camera module comprising an optical structure capable of adjusting the focal point of a lens, a manufacturing method of such a camera module, an electronic apparatus incorporating such a camera module, and a manufacturing method of an electronic apparatus incorporating such a camera module.

As conventional camera modules, there is a camera module produced by combining an optical structure including a lens with a solid-state image pickup device (see, for example, Japanese Patent Application Laid Open No. 11-295576 (1999)). Moreover, an image module (camera module) with an auto-focus function capable of adjusting the focal point of a lens was proposed (see, for example, Japanese Patent Application Laid Open No. 2003-75712).

An electronic image pickup apparatus (conventional example 1) disclosed in Japanese Patent Application Laid Open No. 11-295576 (1999) is an electronic image pickup apparatus (camera module) comprising a solid-state image pickup device and a lens assembly which are coaxially disposed so that the solid-state image pickup device is positioned inside the lens assembly on a wiring board. In the electronic image pickup apparatus of conventional example 1, a locking part is formed on the outer periphery of the case of the solid-state image pickup device, a pawl part is formed on the mount (lens assembly), and the lens assembly is attached to the solid-state image pickup device by engaging the locking part and the pawl part. In the conventional example 1, since the locking part is formed on the outer periphery of the case of the solid-state image pickup device, there is a limitation on the outer shape of the case, and there is a problem in terms of reduction of the size of the electronic image pickup apparatus (camera module). Moreover, since a substrate for connecting circuit components other than the solid-state image pickup device is additionally required, there is a problem that the number of parts increases. Further, since the engagement position is limited to the outer periphery of the case and the edge of the mount, there is a problem that sufficient engagement cannot be ensured.

FIG. 1 is a perspective cross sectional view of a conventional image module with an auto-focus function. This conventional image module with an auto-focus function (conventional example 2) is a camera module disclosed in Japanese Patent Application Laid Open No. 2003-75712, and composed mainly of an image packaging (package with a solid-state image pickup device mounted therein) and a lens blade unit (optical structure). The image packaging comprises a sensor 111, a substrate 112, a sensor cover 113, and a sensor filter 114. The sensor 111 performs the function of sensing image data. The sensor 111 is disposed on the substrate 112, the sensor cover 113 externally covers the sensor 111 and the substrate 112, and the sensor filter 114 only passes light between the sensor cover 113 and the sensor 111 and shuts out the external environment.

The lens blade unit performs the function of an actuator, and comprises elastic means 116 to which a current is supplied from outside, a coil 119 wound so that an induced current flows from the elastic means 116, a magnet 120 disposed so that an electromagnetic field is formed by the current flowing in the coil 119, a lens blade 118 that receives the electromagnetic force generated by the coil 119 and magnet 120 at the upper and lower sides, and a lens 117 which is connected to the middle of the lens blade 118 and moves up and down. Moreover, the lens blade unit has a holder 15 positioned outside the sensor cover 113 to support the elastic means 116.

In the conventional example 2, since it is necessary to additionally connect a lead wire to the elastic means 116 which also functions as a terminal of the coil 119, there are problems that the assembly process is complicated and the number of parts increases. Moreover, there are problems that it is not easy to connect the image packaging and the lens blade unit, it is difficult to separate the image packaging and the lens blade unit from each other if they are connected once, and, if one of them has a defect, both of them are treated as defective. Further, in the case where the optical structure and the device substrate are bonded together, it is necessary to wash the bonding surface of the optical structure and it is necessary to apply heat to harden an adhesive, thereby causing bad influences on the optical structure.

As described above, the camera module of conventional example 1 has a limitation in terms of reduction of the size because the case in which the solid-state image pickup device is mounted is engaged with the lens assembly, and also has a problem that the number of parts increases. Moreover, this camera module has a problem that sufficient engagement cannot be ensured. On the other hand, the camera module of conventional example 2 suffers from problems that the connection of the coil terminal for auto-focus is complicated, and the number of parts increases. Further, this camera module has problems that it is difficult to separate the image packaging and the lens blade unit from each other, and it is not easy to reduce the cost because an increase in the cost due to defective products cannot be avoided. Besides, in the case where the optical structure and the device substrate are bonded together with a thermosetting adhesive, there is a problem that the optical structure is affected by the washing of its surface and heat in the thermosetting process.

BRIEF SUMMARY

An exemplary embodiment has been made with the aim of solving the above problems, and it is a feature of the exemplary embodiment to provide a camera module capable of allowing a reduction in the size and the number of parts and ensuring secure engagement by engaging an optical structure and a device substrate having a solid-state image pickup device mounted thereon through an intermediate structure without using an adhesive, and capable of avoiding the influences of washing and heat during hardening which are necessary if an adhesive is used, and to provide a manufacturing method thereof. Another feature of the exemplary embodiment is to provide a camera module capable of allowing the optical structure and the intermediate structure (and also the device substrate on which the solid-state image pickup device is mounted) to be easily separated from each other, and a manufacturing method thereof.

Still another feature of the exemplary embodiment is to provide a camera module capable of allowing a reduction in the number of parts and the number of processing steps and simplifying the connection of the coil (coil terminal) for adjusting the focal point by extending the coil terminal from the optical structure to a connection terminal section formed in the device substrate, and to provide a manufacturing method of a camera module capable of allowing operation tests on the optical structure and the device substrate to be easily performed, and allowing the optical structure and the device substrate to be easily separated from each other in case of defects.

Yet another feature of the exemplary embodiment is to provide an electronic apparatus capable of allowing a reduction in the size and the number of parts and simplifying the assembly by using a camera module of the present invention. A further feature of the exemplary embodiment is to provide a manufacturing method of an electric apparatus capable of simplifying the process of connecting the coil terminal of a coil for adjusting the focal point by extending the coil terminal of the coil from the optical structure to the connection terminal section formed in the device substrate, and connecting the coil terminal and the apparatus substrate when electrically connecting the device substrate and the apparatus substrate.

A camera module according to an exemplary embodiment is a camera module comprising an optical structure capable of adjusting a focal point of a lens system, and a device substrate on which a solid-state image pickup device is mounted to correspond to the lens system, and characterized by comprising an intermediate structure disposed between the optical structure and the device substrate, wherein at least one of the optical structure and intermediate structure has a fitting section for fitting the other structure.

According to an exemplary embodiment, it is just necessary to fit the intermediate structure and the optical structure together, and it is possible to easily separate the optical structure because the intermediate structure and the optical structure are not fixed (bonded) together. Therefore, the optical structure can readily be attached to or removed from the intermediate structure. When a defect is detected in a characteristic inspection performed after fitting the optical structure with the device substrate, it is possible to easily replace (repair) the device substrate or the optical structure if a replacement of the device substrate or the optical structure is necessary. Moreover, since an adhesive is not used when coupling the intermediate structure and the optical structure, there is no need to perform the heating process for hardening an adhesive which is necessary if an adhesive, particularly a thermosetting adhesive, is used, thereby avoiding the influence of heat on the lens system and coil that constitute the optical structure.

The camera module according to an exemplary embodiment is characterized in that the intermediate structure is fixed to the device substrate.

According to an exemplary embodiment, it is possible to accurately regulate the fitting position of the optical structure by fixing the intermediate structure to the device substrate.

The camera module according to an exemplary embodiment is characterized in that the fitting section is provided in at least two positions.

According to an exemplary embodiment, it is possible to accurately position the optical structure with respect to the intermediate structure (and the device substrate) by providing the fitting sections at two positions.

The camera module according to an exemplary embodiment is characterized in that fitting sections in at least two positions among the fitting sections are holding projecting sections that project from one structure having the fitting sections so as to hold the other structure.

According to an exemplary embodiment, since one structure has a pair of holding projection sections formed (at two positions) to hold and fit the side faces of the other structure, it is possible to certainly hold the other structure and ensure stable fitting.

The camera module according to an exemplary embodiment is characterized in that the other structure has notched portions corresponding to the holding projecting sections.

According to an exemplary embodiment, since the notched portions corresponding to the holding projecting sections are formed so that the holding projecting sections and the notched portions engage with each other, it is possible to ensure secure fitting.

The camera module according to an exemplary embodiment is characterized in that the holding projecting section has a fitting pawl.

According to an exemplary embodiment, since the holding projecting sections have the fitting pawls, it is possible to prevent the holding projecting sections from being separated from the notched portions and ensure more secure fitting.

The camera module according to an exemplary embodiment is characterized in that an outer shape of the optical structure seen from a light incident side of the lens system is rectangular, and the optical structure has the holding projecting sections, or the notched portions corresponding to the holding projecting sections, at positions biased to corners of the rectangular shape.

According to an exemplary embodiment, the outer shape of the optical structure seen from the light incident side (front side) of the lens system is rectangular (the plan view of the optical structure seen from the light incident side is rectangular), the corner space of the optical structure formed between the outer side face of the rectangular shape and the outer side face of the cylindrical lens system (and the driving coil) can be effectively used, and therefore there is no need to increase the size of the rectangular shape (plane shape) of the optical structure even when the holding projecting sections or the notched portions are provided.

The camera module according to an exemplary embodiment is characterized in that the optical structure has a projecting section projecting toward the intermediate structure, and the intermediate structure has a notched portion corresponding to the projecting section of the optical structure.

According to an exemplary embodiment, since the optical structure has a projecting section projecting toward the intermediate structure and the intermediate structure has a notched portion corresponding to the projecting section of the optical structure, it is possible to fit the optical structure and the intermediate structure in a manner different from the fitting sections (in which the depression and projection relationship is reverse), and it is possible to ensure stable fitting. Moreover, since the projecting section projects from the optical structure, it is possible to extend the terminal line of the coil in contact with the projecting section.

The camera module according to an exemplary embodiment is characterized in that the projecting section has a fitting pawl.

According to an exemplary embodiment, since the projecting section has a fitting pawl, it is possible to prevent the projecting section from being separated from the notched portion, thereby ensuring more secure fitting.

The camera module according to an exemplary embodiment is characterized in that a coil terminal drawn from a coil incorporated in the optical structure to adjust the focal point of the lens system is extended along the projecting section of the optical structure to a coil connection terminal section formed in the device substrate.

According to an exemplary embodiment, with the extension of the coil terminal to the coil connection terminal section formed in the device substrate, when connecting the connection terminal section of the device substrate to the apparatus substrate (mother board) of an electronic apparatus by soldering or other technique, the coil terminal and the coil connection terminal section can also be connected to the apparatus substrate simultaneously, thereby simplifying the process of connecting the coil (coil terminal). In short, it is possible to reduce the number of parts and the number of processing steps for connecting the coil.

The camera module according to an exemplary embodiment is characterized in that the device substrate is a leadless chip carrier type substrate.

According to an exemplary embodiment, since the device substrate is of a leadless chip carrier type, it is possible to easily connect the connection terminal section of the device substrate to the apparatus substrate (mother board) of an electronic apparatus, and it is also possible to easily reduce the size of the electronic apparatus.

A camera module according to an exemplary embodiment is a camera module comprising an optical structure having a coil for adjusting a focal point of a lens system, and a device substrate on which a solid-state image pickup device is mounted to correspond to the lens system, and characterized by comprising a coil terminal extended along a side face of the optical structure to a coil connection terminal section formed in the device substrate.

According to an exemplary embodiment, with the extension of the coil terminal to the coil terminal connection section formed in the device substrate, when connecting the connection terminal section of the device substrate to the apparatus substrate (mother board) of an electronic apparatus by soldering or other technique, the coil terminal can also be connected to the apparatus substrate of the electronic apparatus simultaneously, thereby simplifying the connection of the coil (coil terminal). In short, it is possible to reduce the number of parts and the number of processing steps for mounting an auto-focus camera module in an electronic apparatus.

The camera module according to an exemplary embodiment is characterized by comprising an intermediate structure disposed between the optical structure and the device substrate, wherein the optical structure has a projecting section projecting toward the intermediate structure, and the coil terminal is placed along the projecting section of the optical structure.

According to an exemplary embodiment, the intermediate structure is disposed between the optical structure and the device substrate, the optical structure has a projecting section projecting toward the intermediate structure, and the coil terminal is placed along the projecting section of the optical structure, and therefore it is possible to certainly extend the coil terminal to the device substrate from the optical structure and securely connect the coil terminal to the apparatus substrate of an electronic apparatus.

The camera module according to an exemplary embodiment is characterized in that the intermediate structure has a notched portion corresponding to the projecting section.

According to an exemplary embodiment, in addition to the holding projecting sections, the intermediate section has a notched portion that is opposite in the depression and projection relationship, thereby ensuring more secure fitting of the intermediate structure and the optical structure.

The camera module according to an exemplary embodiment is characterized in that at least one of the optical structure and intermediate structure has holding projecting sections which are formed at two positions so as to hold the other structure.

According to an exemplary embodiment, since at least one of the optical structure and intermediate structure has a pair of holding projecting sections formed (at two positions) to hold and fit the other structure, it is possible to certainly hold the other structure, thereby ensuring stable fitting.

The camera module according to an exemplary embodiment is characterized in that an image signal processing circuit is mounted on the device substrate, and the coil connection terminal section corresponding to the coil terminal is positioned on an opposite side to a mount position of the image signal processing circuit.

According to an exemplary embodiment, by taking the coil terminal to which a larger current is supplied compared to an image signal from a position on the opposite side to the mount position of the image signal processing circuit, the thermal and electromagnetic influences of the coil current on the image signal processing circuit are reduced.

The camera module according to an exemplary embodiment is characterized in that the coil connection terminal section corresponding to the coil terminal has a larger area than other connection terminal section formed in the device substrate.

According to an exemplary embodiment, by reducing the resistance in the path in which the coil current flows, the generation of heat by the coil current is restrained.

An electronic apparatus according to an exemplary embodiment is characterized in that a camera module of is mounted on an apparatus substrate.

According to an exemplary embodiment, since the camera module is mounted on the apparatus substrate, the electronic apparatus having the characteristics of the camera module of the present invention is obtained.

A manufacturing method of a camera module according to an exemplary embodiment is a manufacturing method of a camera module comprising an optical structure capable of adjusting a focal point of a lens system, a device substrate on which a solid-state image pickup device is mounted to correspond to the lens system, and an intermediate structure disposed between the optical structure and the device substrate, and characterized by comprising: a first step of mounting the solid-state image pickup device on the device substrate; a second step of fixing the intermediate structure to the device substrate on an outer periphery of the solid-state image pickup device after the first step; and a third step of fitting the intermediate structure and the optical structure.

According to an exemplary embodiment, since the camera module is made by just fitting the optical structure and the intermediate structure fixed to the device substrate, it is possible to omit the process of bonding the intermediate structure and the optical structure and eliminate the necessity of heating in the bonding process, thereby removing the thermal influence on the lens system and magnet that constitute the optical structure.

The manufacturing method of a camera module according to an exemplary embodiment is characterized by comprising a fourth step of inspecting the characteristics of the camera module by supplying a predetermined signal to the connection terminal section of the device substrate in a state in which the intermediate structure and the optical structure are fitted, and supplying a coil current to the coil terminal drawn from the coil incorporated in the optical structure to adjust the focal point of the lens system and extended to the coil connection terminal section.

According to an exemplary embodiment, by inspecting the characteristics in the state in which the intermediate structure and the optical structure are fitted (by performing an operation test on the optical structure for driving the lens system by supplying a coil current in addition to an operation test on the device substrate), it is possible to easily deal with a defective product at the time the fitting process is completed. In other words, since the device substrate or the optical structure can be readily replaced, it is possible to effectively use, especially, the expensive optical structure, thereby providing a significant effect in reducing the manufacturing cost.

The manufacturing method of a camera module according to an exemplary embodiment is characterized by comprising a fifth step of inspecting the characteristics of the device substrate on which the solid-state image pickup device is mounted, before the second step or the third step.

According to an exemplary embodiment, since the optical structure is fitted after inspecting the characteristics of the device substrate, it is possible to prevent the optical structure from being fitted together with a defective device substrate, thereby preventing wasteful use of the expensive optical structure.

A manufacturing method of an electronic apparatus according to an exemplary embodiment is a manufacturing method of an electronic apparatus by connecting to an apparatus substrate a camera module comprising an optical structure having a coil for adjusting a focal point of a lens system, a device substrate on which a solid-state image pickup device is mounted to correspond to the lens system, an intermediate structure disposed between the optical structure and the device substrate, and a coil terminal taken out from a side face of the optical structure and extended along a side face of the intermediate structure to a coil connection terminal section formed in the device substrate, and characterized by comprising: a first step of mounting the solid-state image pickup device on the device substrate; a second step of fixing the intermediate structure to the device substrate on an outer periphery of the solid-state image pickup device after the first step; a third step of fitting the intermediate structure and the optical structure; a sixth step of correctly positioning the device substrate and the apparatus substrate with respect to each other; and a seventh step of connecting the coil terminal to the coil connection terminal section and the apparatus substrate by electrically connecting the device substrate and the apparatus substrate after the sixth step.

According to an exemplary embodiment, it is possible to electrically connect the coil terminal to the coil connection terminal section and the apparatus substrate when electrically connecting the device substrate and the apparatus substrate, it is not necessary to perform an additional process for connecting the coil terminal, it is possible to simplify the coil terminal connection process, it is possible to simplify the manufacture of the electronic apparatus, and it is possible to reduce the cost.

According to an exemplary embodiment, by fitting the intermediate structure and the optical structure, it is possible to provide a camera module and a manufacturing method thereof, capable of allowing the optical structure to be easily detached. Therefore, if a defect is detected in a characteristic inspection performed after fitting the optical structure and the device substrate, the device substrate or the optical structure can be readily replaced. Moreover, when coupling the intermediate structure and the optical structure, there is no need to perform the heating process for hardening an adhesive which is essential especially when a thermosetting adhesive is used, and it is thus possible to provide a camera module and a manufacturing method thereof, capable of avoiding the influence of heat on the optical structure (lens, coil, etc.).

According to an exemplary embodiment, with the extension of the coil terminal of the coil for adjusting the focal point of the lens system along a side face of the optical structure to the coil connection terminal section formed in the device substrate, when connecting the connection terminal section of the device substrate to the apparatus substrate (mother board) of an electronic apparatus by soldering or other technique, the coil terminal can also be connected to the apparatus substrate simultaneously, and therefore it is possible to provide a camera module capable of simplifying the process of connecting the coil (coil terminal). In the case of the camera module comprising an intermediate structure, by supplying a coil current to the coil in the state in which the intermediate structure and the optical structure are fitted, it is possible to inspect the characteristics of the camera module at the time the fitting process is completed, and consequently it is possible to provide a camera module and a manufacturing method thereof capable of easily dealing with a defective product.

According to an exemplary embodiment, by making an electronic apparatus comprising a camera module of the present invention, it is possible to provide the electronic apparatus and a manufacturing method thereof having the characteristics of the camera module of the present invention and the manufacturing method thereof.

The above features of the exemplary embodiment will more fully be apparent from the following detailed description with accompanying drawings.

DETAILED DESCRIPTION

The following description will explain the present invention, based on the drawings illustrating some embodiments thereof.

Embodiment 1

Figure 1:
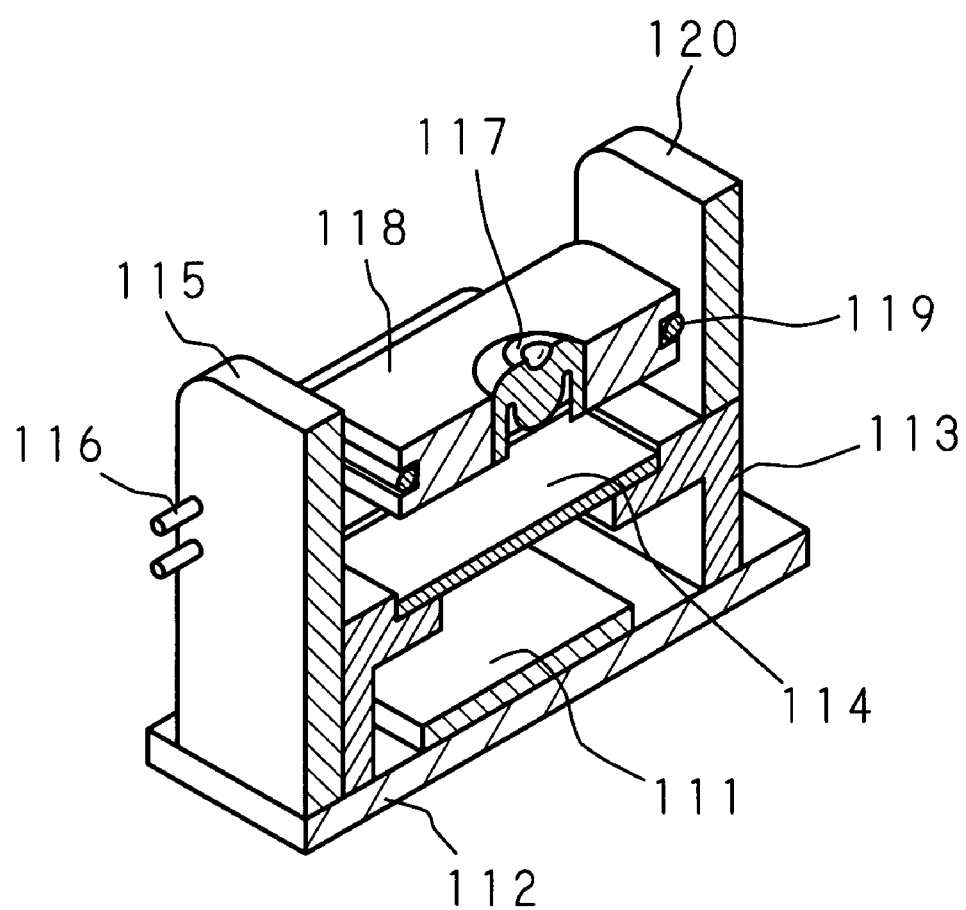
FIG. 1 is a perspective cross sectional view of a conventional image module with an auto-focus function.
Figure 2:
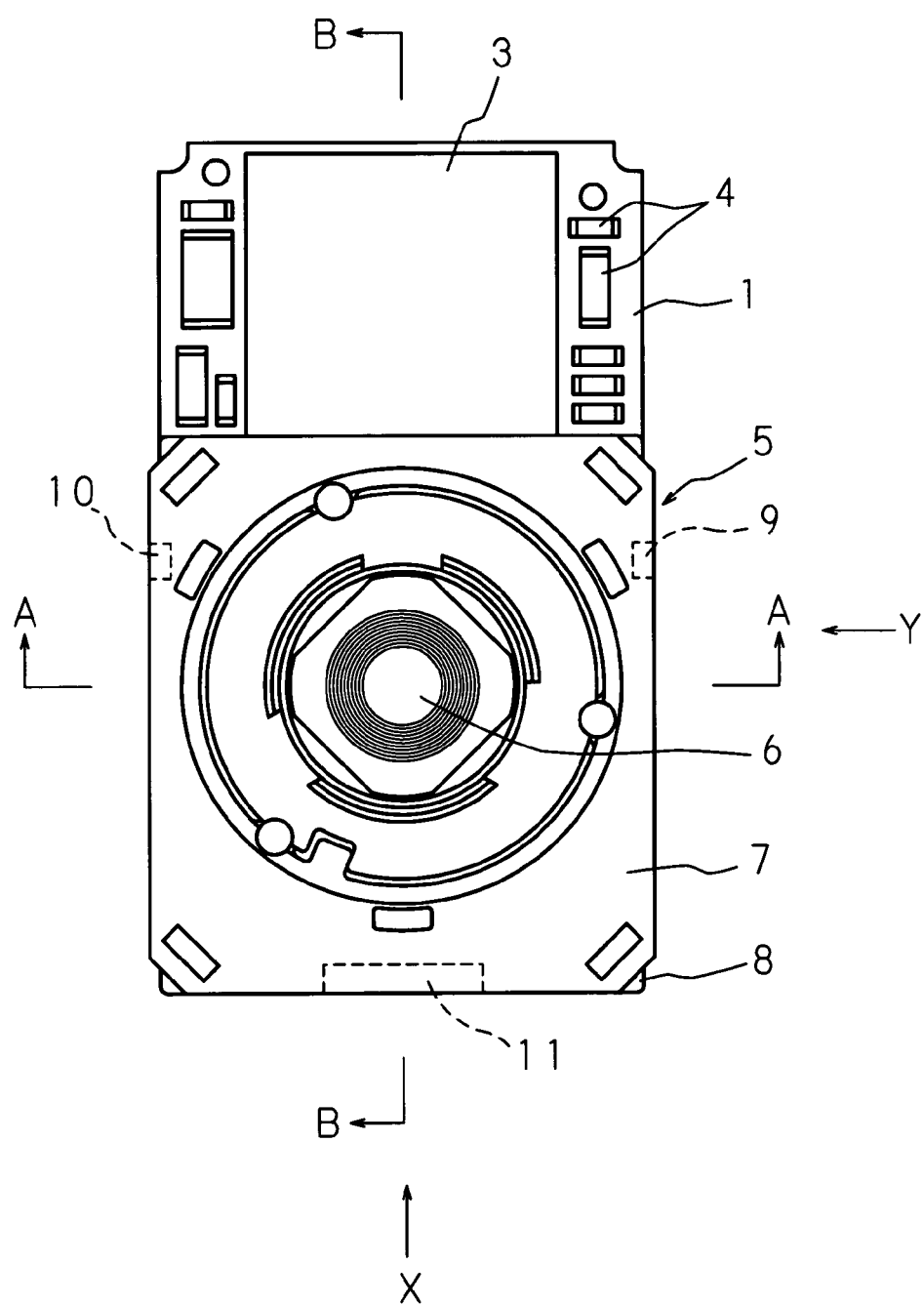
FIG. 2 is a schematic plan view of a camera module according to Embodiment 1.

FIG. 2 is a schematic plan view of a camera module according to Embodiment 1. In other words, the shape seen from the light incident side of a lens system is shown. In FIG. 2, the reference numeral 1 represents a device substrate, and a solid-state image pickup device 2 (see FIG. 3) and a DSP (digital signal processor) 3, which is a processor for image signal processing and transmits and receives signals to/from the solid-state image pickup device 2, are mounted on the same surface of the device substrate 1. The DSP 3 transmits and receives signals not only to/from the solid-state image pickup device 2, but also to/from outside of the device substrate 1 (for example, the apparatus substrate of an electronic apparatus). Chip pans 4 such as resistors are suitably mounted on the device substrate 1.

An optical structure 5 is disposed on the surface of the device substrate 1, and a lens system 6 for introducing external light (image light, picture light) into the solid-state image pickup device 2 is placed in the center of the optical structure 5. In short, the solid-state image pickup device 2 is mounted on the device substrate 1 to correspond to the lens system 6. The optical structure 5 is formed so that its outer shape seen from the light incident side of the lens system 6 is rectangular and its plane shape forms a rectangular frame section 7. An intermediate structure 8 is disposed between the device substrate 1 and the optical structure 5. The intermediate structure 8 has fitting sections 9 and 10 for fitting the optical structure 5 (or for allowing the optical structure 5 to fit the intermediate structure 8) on a part of side faces of the frame section 7. Moreover, the intermediate structure 8 has an engagement section 11 for engaging the optical structure 5 with the intermediate structure 8 (or for allowing the optical structure 5 to engage with the intermediate structure 8) on a part of side faces of the frame section 7. With the fitting in at least two points (two positions) and the engagement in one point (one position) on different sides of the frame section 7, it is possible to accurately position the optical structure 5 with respect to the intermediate structure 8 (device substrate 1) and securely fit (engage) them.

Since it is only necessary to fit (engage) the intermediate structure 8 and the optical structure 5 without fixing (bonding) them together, it is possible to easily detach the optical structure 5. When a defect is detected in a characteristic inspection performed after engaging (fitting) the optical structure 5 with the device substrate 1, it is possible to easily replace (repair) the device substrate 1 or the optical structure 5 if a replacement of the device substrate 1 or the optical structure 5 is necessary. Moreover, since an adhesive is not used when coupling the intermediate structure 8 and the optical structure 5, there is no need to perform the heating process for hardening an adhesive which is necessary if an adhesive, particularly a thermosetting adhesive, is used, thereby avoiding the influence of heat on the lens system and coil that constitute the optical structure 5.

The fitting sections 9 and 10 at two positions are holding projecting sections 24 (see FIG. 6 and FIG. 7) which project from the intermediate structure 8 to hold the optical structure 5. The fitting sections 9 and 10 make a pair and face each other so as to hold the frame section 7 from two directions, and therefore the intermediate structure 8 can securely and stably fit (hold) the optical structure 5. By arranging the positions of the fitting sections 9 and 10 (holding projecting sections 24, notched portions 25 (see FIG. 6 through FIG. 8)) on a plane to be positions biased to the corners of the frame section 7, it is possible to effectively use the corner space of the frame section 7 formed between a circular member (cylindrical member) such as the lens system 6 and the rectangular frame section 7, and it is possible to prevent an increase in the area of the plane of the optical structure 5. The engagement section 11 is composed of a projecting section projecting from the optical structure 5 and a notched portion in a side face of the intermediate structure 8 corresponding to the projecting section, and these projecting section and notched portion are designed to engage with each other. In other words, it is possible to ensure secure and stable engagement by providing the engagement section opposite in the depression and projection relationship.

Figure 3:
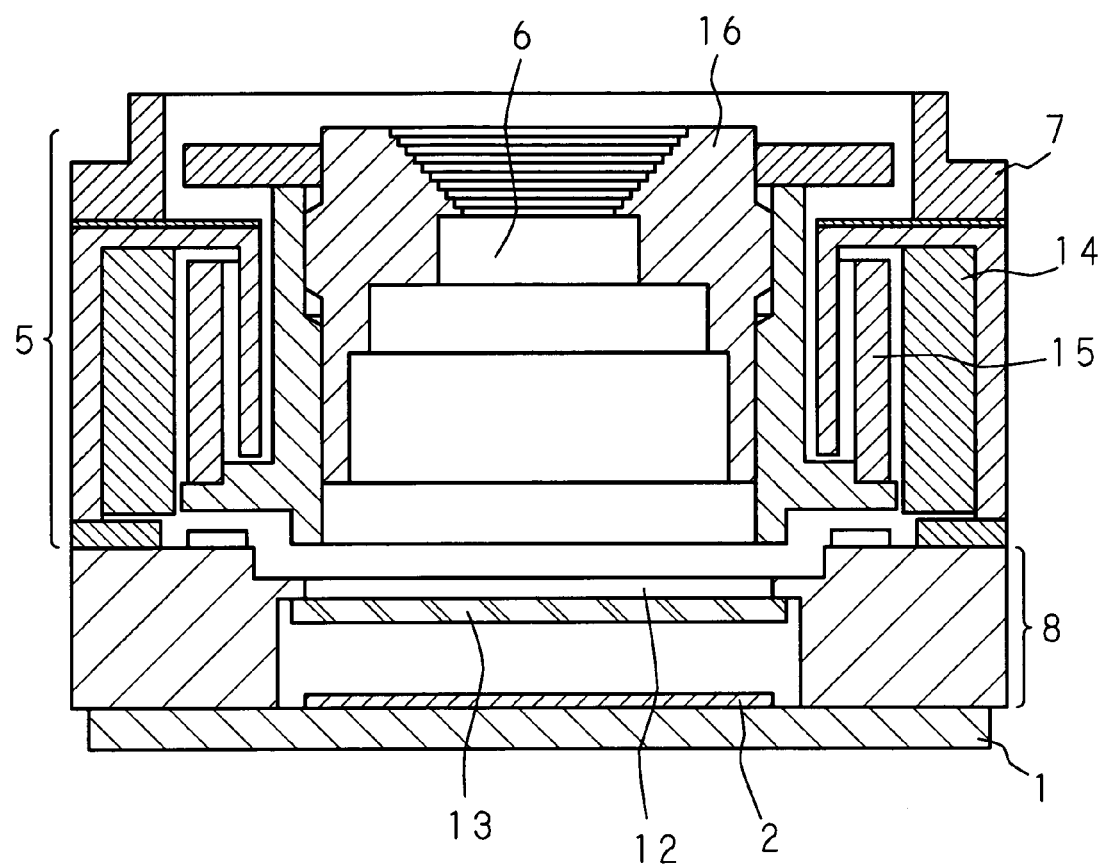
FIG. 3 is an enlarged schematic cross sectional view along the A-A direction of arrows of FIG. 2.

FIG. 3 is an enlarged schematic cross sectional view along the A-A direction of arrows of FIG. 2. The same parts as in FIG. 2 are designated with the same reference codes, and detailed explanation thereof is omitted suitably. The solid-state image pickup device 2 in the form of a chip is mounted (die-bonded, wire-bonded) on the device substrate 1. The intermediate structure 8 is fixed (bonded) to the device substrate 1 on the periphery of the solid-state image pickup device 2 by using, for example, an epoxy resin adhesive. By fixing the intermediate structure 8 to the device substrate 1, it is possible to accurately regulate the fitting position of the optical structure 5. As the intermediate structure 8, one molded using a plastic (synthetic resin) is prepared. In the intermediate structure 8, a window section 12 is formed at a position corresponding to the solid-state image pickup device 2, and an optical filter 13 (optical filter for cutting infrared rays) is attached to the window section 12. As the optical filter 13, it may also be possible to use other optical filters such as an optical low-pass filter and a simple protection filter, or a filter having a plurality of functions, instead of the infrared cut filter.

The optical structure 5 which is fitted together with the intermediate structure 8 has the lens system 6 constructed by suitably combining a plurality of lenses in the center thereof. A magnet 14 is disposed inside the frame section 7 of the optical structure 5, and a coil 15 is placed inside the magnet 14. The magnet 14 and the coil 15 are formed concentrically in the optical structure 5, and placed concentrically around the lens system 6. By causing a coil current to flow in the coil 15, it is possible to generate an attractive force or a repulsive force between the coil 15 and the magnet 14, and suitably move the position of the coil 15 up and down. The coil 15 is designed so that it moves together with a lens holder 16 that holds the lens system 6, and the focal point of the lens system 6 can be appropriately adjusted by adjusting the coil current. In other words, the optical structure 5 has a structure capable of adjusting the focal point of the lens system. Note that the coil 15 and the lens holder 16 are supported in a space by using suitable plate springs (not shown).

Figure 4:
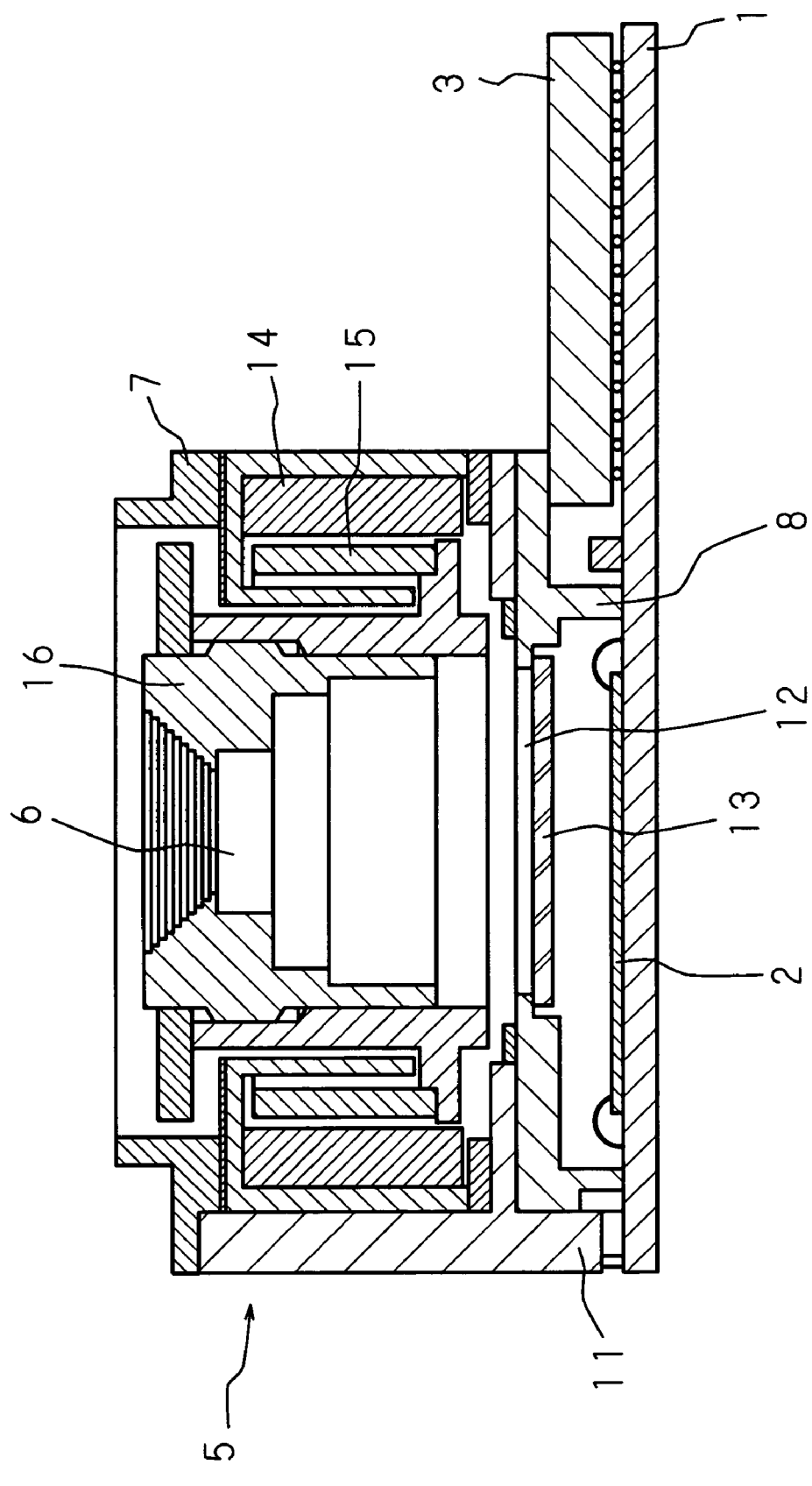
FIG. 4 is a schematic cross sectional view along the B-B direction of arrows of FIG. 2.

FIG. 4 is a schematic cross sectional view along the B-B direction of arrows of FIG. 2. The same parts as in FIG. 2 and FIG. 3 are designated with the same reference codes, and detailed explanation thereof is omitted suitably. The DSP 3 composed of a chip-size package is mounted (boll-bonded) on the device substrate 1. FIG. 4 schematically shows the engagement section 11 where a projecting section 19 (see FIG. 7 and FIG. 8) projecting from the optical structure 5 is extended toward the intermediate structure 8 and engaged.

Figure 5:
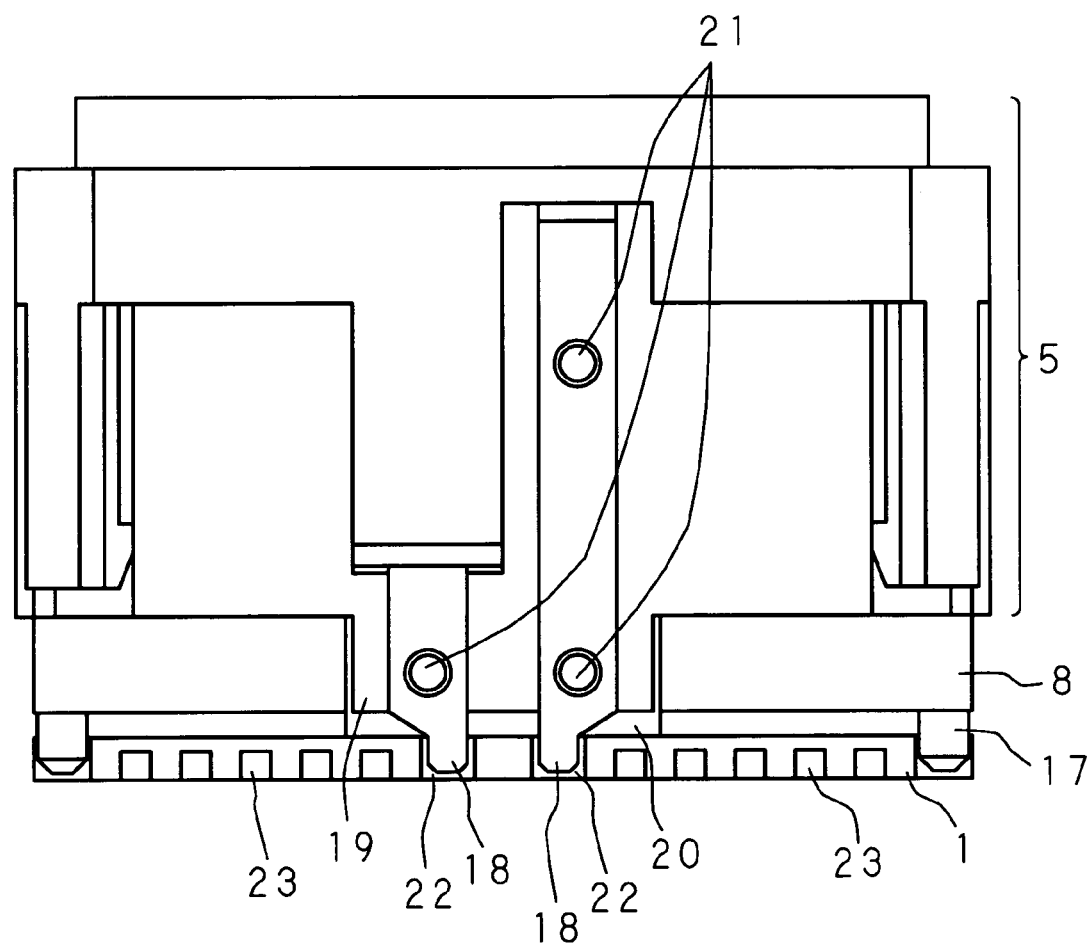
FIG. 5 is an enlarged schematic side view seen from the direction of arrow X of FIG. 2.

FIG. 5 is an enlarged schematic side view seen from the direction of arrow X of FIG. 2. The same parts as in FIG. 2 through FIG. 4 are designated with the same reference codes, and detailed explanation thereof is omitted suitably. On the intermediate structure 8, projecting sections 17 projecting into notched portions in the corners of the device substrate 1 are formed so as to easily and accurately position the device substrate 1 and the intermediate structure 8 with respect to each other. A coil terminal 18 connected to the coil 15 is drawn out from a side face of the optical structure 5 and extended along the side face of the optical structure 5 to the device substrate 1. The projecting section 19 (corresponding to the engagement section 11) which comes into engagement with a side face of the intermediate structure 8 is formed so that it projects from the optical structure 5 and appropriately engages with a notched portion 20 in the intermediate structure 8. The coil terminal 18 is designed so that it appropriately engages with projecting sections 21 formed in the side face of the optical structure 5, and fixed to the optical structure 5. The coil terminal 18 is extended along the projecting section 19 to a coil connection terminal section 22 formed in the device substrate 1 so that the coil terminal 18 and the coil connection terminal section 22 can be connected to each other. Note that, in this state, the coil terminal 18 may not be in contact with the coil connection terminal section 22 as long as it is electrically connected to the wiring section of the apparatus substrate (mother board) for the coil terminal 18 by soldering or other technique in a later-described mounting process to the apparatus substrate.

The device substrate 1 is made of a leadless chip carrier type substrate (ceramic substrate). By using the leadless chip charier type, it is possible to reduce the size of a camera module and reduce the size of the main body of an electronic apparatus (see Embodiment 2) in which the camera module is mounted. In the side face of an end of the device substrate 1, a connection terminal section 23 is formed as a terminal for image signal processing (a connection terminal to the solid-state image pickup device 2 and the DSP 3 as an image signal processing circuit) in addition to the coil connection terminal section 22. Since the current to be supplied to the coil connection terminal section 22 is large, the coil connection terminal section 22 is formed as a terminal having a larger area than the connection terminal section 23, thereby ensuring secure connection, reducing connection resistance, and preventing heat from being generated by resistances. Since the device substrate 1 is a leadless chip carrier type substrate, when connecting the coil connection terminal section 22 and the connection terminal section 23 of the device substrate 1 to the apparatus substrate (mother board) 50 of an electronic apparatus (see FIG. 9), it is possible to easily connect them.

With the extension of the coil terminal 18 to the coil connection terminal section 22 formed in the device substrate 1, when connecting the connection terminal section 23 of the device substrate 1 to the apparatus substrate (mother board) 50 of the electronic apparatus by soldering or other technique, the coil terminal 18 and the coil connection terminal section 22 can also be connected to the apparatus substrate 50 simultaneously, thereby simplifying the process of connecting the coil 15 (coil terminal 18). In other words, it is possible to reduce the number of parts and the number of processing steps for mounting the auto-focus camera module in the electronic apparatus.

The coil connection terminal section 22 corresponding to the coil terminal 18 is positioned on the opposite side to the mount position of the DSP 3 on the device substrate 1. By taking the coil terminal 18 to which a larger current is supplied compared to an image signal from a position on the opposite side to the mount position of the image signal processing circuit, the thermal and electromagnetic influences of the coil current on the image signal processing circuit are reduced.

Figure 6:
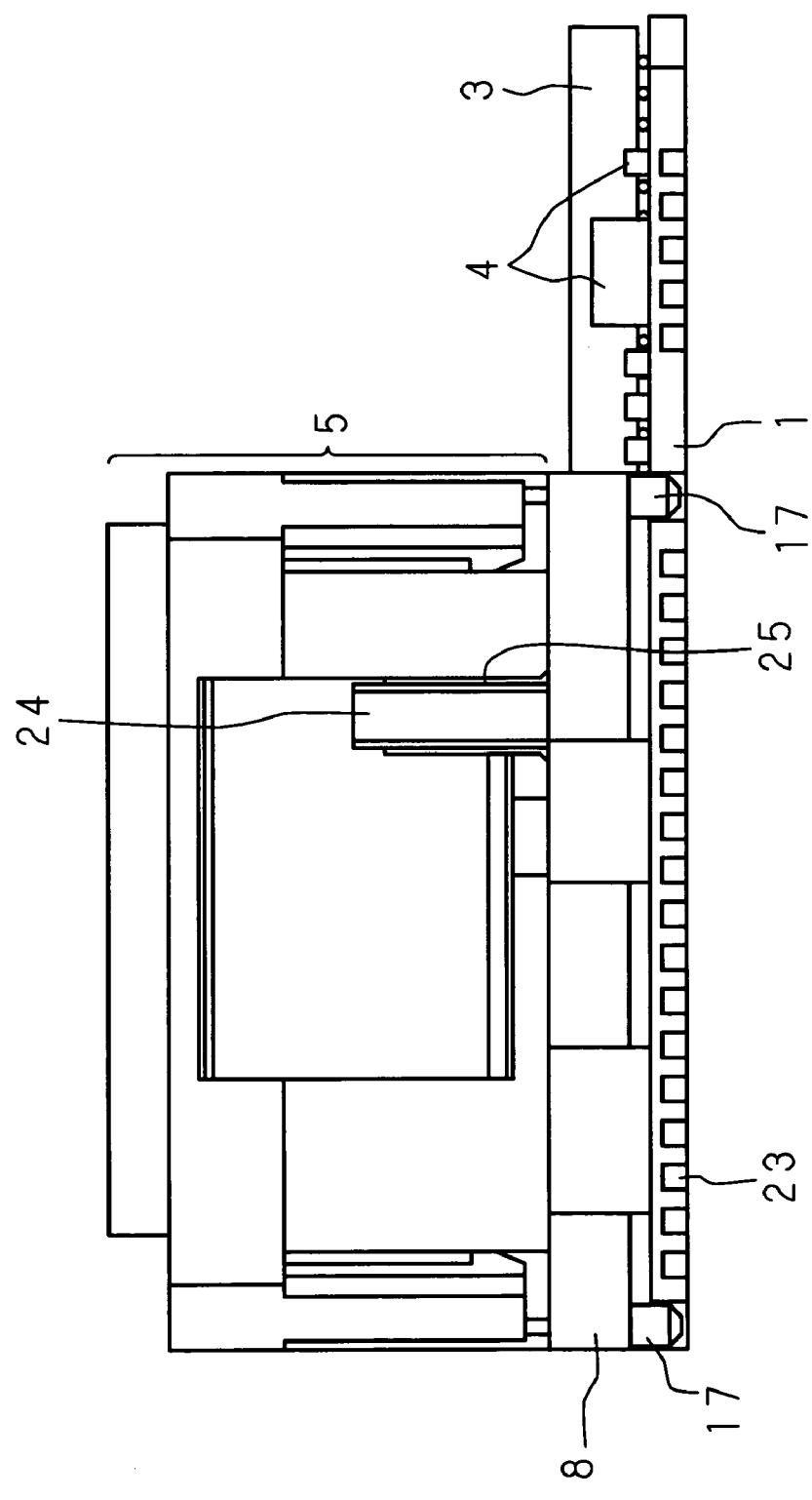
FIG. 6 is an enlarged schematic side view seen from the direction of arrow Y of FIG. 2.

FIG. 6 is an enlarged schematic side view seen from the direction of arrow Y of FIG. 2. The same parts as in FIG. 2 through FIG. 5 are designated with the same reference codes, and detailed explanation thereof is omitted suitably. The DSP 3 and the chip parts 4 are mounted on the device substrate 1. On the intermediate structure 8, the projecting sections 17, 17 projecting into the notched portion in the corner of the device substrate 1 and a notched portion in the middle of a side face of the device substrate 1 seen from the direction of arrow Y, respectively, are formed so as to easily and accurately position the device substrate 1 and the intermediate structure 8 with respect to each other. The connection terminal section 23 is formed in the side face of the device substrate 1. The holding projecting section 24 and the notched portion 25 corresponding to the fitting section 9 (10) are formed. The holding projecting section 24 projects from the intermediate structure 8 so as to hold the optical structure 5. The holding projecting section 24 also engages with the notched portion 25 formed in the optical structure 5. Since the holding projecting section 24 and the notched portion 25 engage with each other, it is possible to ensure secure fitting.

Figure 7:
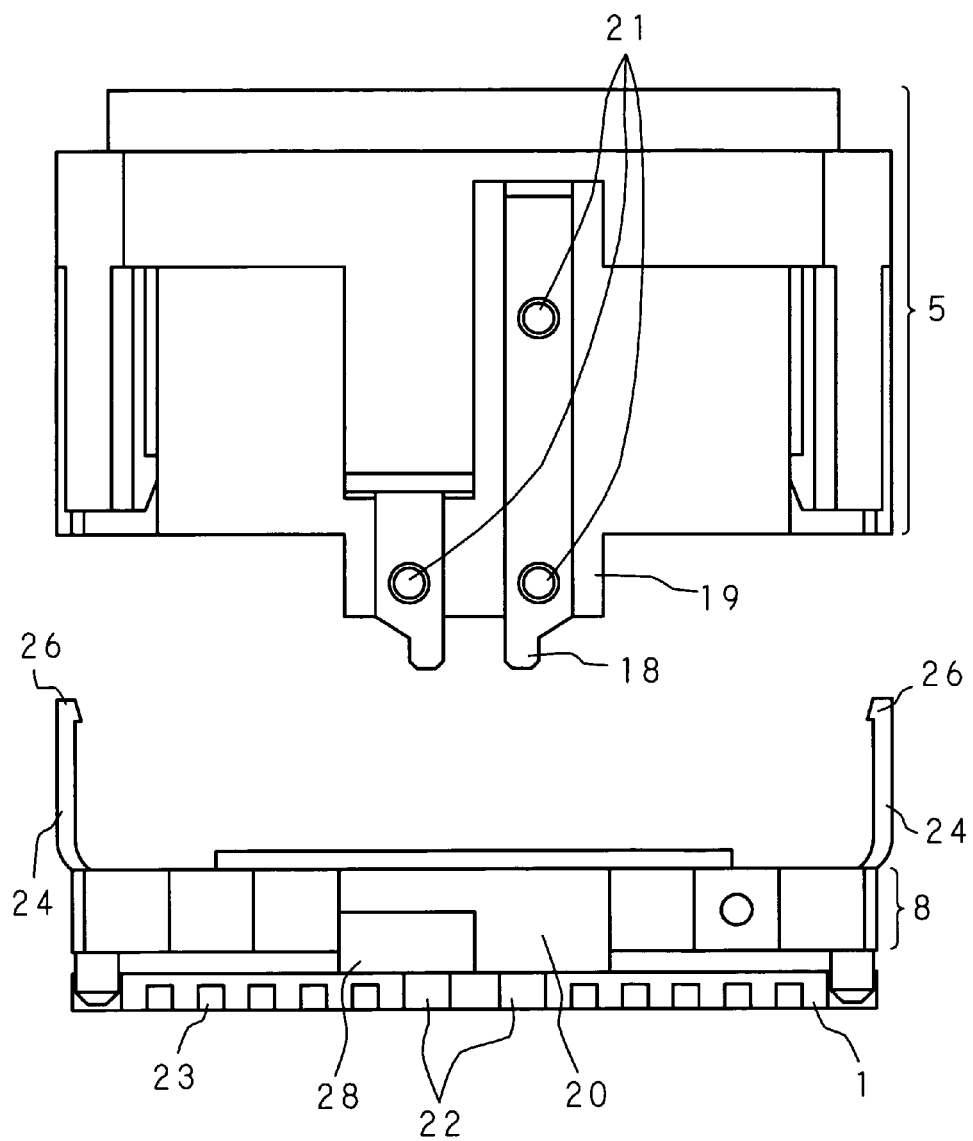
FIG. 7 is a schematic exploded side view seen from the direction of arrow X of FIG. 2.

FIG. 7 is a schematic exploded side view seen from the direction of arrow X of FIG. 2. The same parts as in FIG. 2 through FIG. 6 are designated with the same reference codes, and detailed explanation thereof is omitted suitably. A pair of holding projecting sections 24 projecting from the intermediate structure 8 toward the optical structure 5 is formed to correspond to the fitting sections 9 and 10. The holding projecting sections 24 have a suitable curvature in their raised portions so that they have elasticity, and are extended in the form of a plate. A fitting pawl 26 is formed at the tip of each holding projecting section 24. With the fitting pawls 26, it is possible to prevent the holding projecting sections 24 from being detached from the notched portions 25, ensure a more stable fitted state, and prevent the optical structure 5 and the intermediate structure 8 from being easily separated from each other.

The projecting section 19 is formed on the optical structure 5 and the notched portion 20 is formed in the intermediate structure 8 to correspond to the engagement section 11. Since the optical structure 5 has the projecting section 19 that engages with the notched portion 20 in a side face of the intermediate structure 8, it is possible to engage the optical structure 5 and the intermediate structure 8 in a manner different from the fitting sections 9 and 10 (in which the depression and projection relationship is reverse), and it is possible to engage the optical structure 5 and the intermediate structure 8 with each other alternately, thereby ensuring stable and secure engagement. Moreover, since the projecting section 19 projects from the optical structure 5 toward the intermediate structure 8, it is possible to extend the coil terminal 18 that is the terminal of the coil 15 in contact with the projecting section 19. A deeper notched portion 28 corresponding to a fitting pawl 27 (see FIG. 8) formed at the tip of the projecting section 19 is formed in the notched portion 20. Since the fitting pawl 27 can prevent the projecting section 19 from being detached from the notched portion 20 and ensure more secure fitting by stabilizing the fitted state, it is possible to prevent the optical structure 5 and the intermediate structure 8 from being easily separated from each other. Note that if the coupling strength between the optical structure 5 and the intermediate structure 8 is sufficient, it may be possible to simply engage the projecting section 19 and the notched portion 20 without providing the fitting pawl 27 and the notched portion 28.

Figure 8:
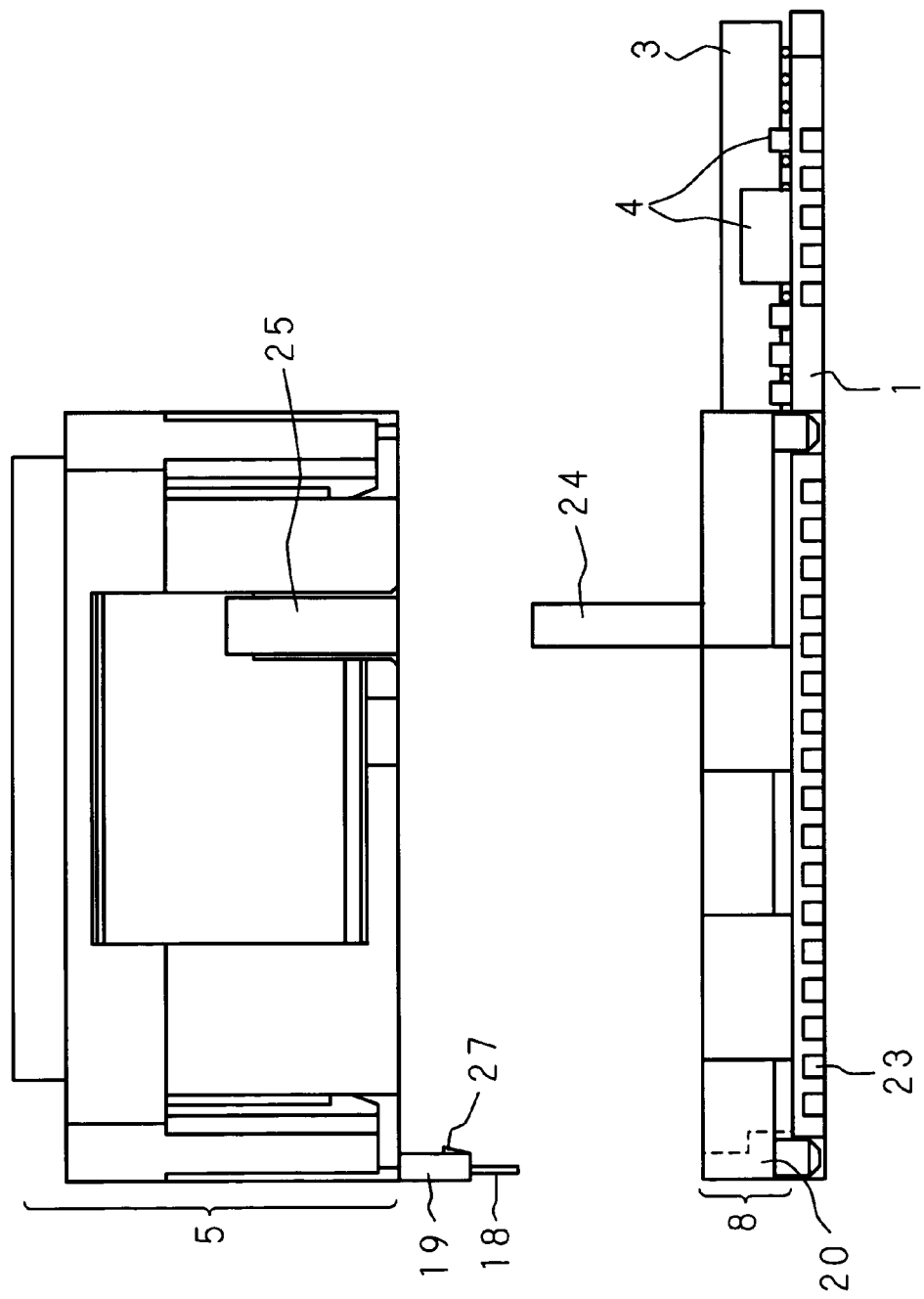
FIG. 8 is a schematic exploded side view seen from the direction of arrow Y of FIG. 2.

FIG. 8 is a schematic exploded side view seen from the direction of arrow Y of FIG. 2. The same parts as in FIG. 2 through FIG. 7 are designated with the same reference codes, and detailed explanation thereof is omitted suitably. The holding projecting section 24 is formed on the intermediate structure 8, and the notched portion 25 is formed in the optical structure 5 to correspond to the fitting section 9. Since the holding projecting section 24 corresponds to the notched portion 25 so that they engage with each other, it is possible to ensure secure fitting. The notched portion 25 is formed at a position biased to the corner of the optical structure 5. Moreover, the projecting section 19 is formed on the optical structure 5 and the notched portion 20 is formed in the intermediate structure 8 to correspond to the engagement section 11. The fitting pawl 27 is formed at the tip of the projecting section 19. The coil terminal 18 is fixed to the projecting section 19 and extended toward the device substrate 1.

Embodiment 2

Embodiment 2 is a manufacturing method of a camera module according to Embodiment 1. More specifically, Embodiment 2 is a manufacturing method of a camera module comprising an optical structure 5 capable of adjusting the focal point of a lens system 6, a device substrate 1 on which a solid-state image pickup device 2 is mounted to correspond to the lens system 6, and an intermediate structure 8 disposed between the optical structure 5 and the device substrate 1. The manufacturing method of a camera module according to this embodiment comprises the process of fixing the intermediate structure 8 to the device substrate 1 on the outer periphery of the solid-state image pickup device 2 after mounting the solid-state image pickup device 2 on the device substrate 1, and the process of fitting the intermediate structure 8 and the optical structure 5. Since the camera module can be made by just fitting the optical structure 5 and the intermediate structure 8 fixed to the device substrate 1, the process of bonding the intermediate structure 8 and the optical structure 5, which is necessary in prior arts, can be omitted, and heating in the bonding process is unnecessary, thereby removing the thermal influence on the lens system 6 and magnet 14 that constitute the optical structure 5.

The manufacturing method of a camera module according to this embodiment further comprises the process of inspecting the characteristics of the camera module by supplying a predetermined signal to the coil connection terminal section 22 and connection terminal section 23 of the device substrate 1 in the state in which the intermediate structure 8 and the optical structure 5 are fitted, and supplying a coil current to the coil terminal 18 which is drawn from the coil 15 in the optical structure 5 for adjusting the focal point of the lens system 6 and extended to the connection terminal section 23. In other words, in addition to an operation test on the device substrate 1, an operation test on the optical structure 5 (autofocus function test) is performed simultaneously by driving the lens system 6 by supplying the coil current. By inspecting the characteristics in the state in which the intermediate structure 8 and the optical structure 5 are fitted, it is possible to easily deal with characteristic defects at the time the engagement process is finished. In other words, it is possible to readily replace the device substrate 1 or the optical structure 5 as a defective product. In particular, since the expensive optical structure 5 can be easily separated from the device substrate 1, if the device substrate 1 has a defect, the optical structure 5 can be effectively used as it is, thereby providing a great effect on the manufacturing cost.

The manufacturing method of a camera module according to this embodiment further comprises the process of inspecting the characteristics of the device substrate 1 on which the solid-state image pickup device 2 is mounted, before the process of fixing the intermediate structure 8, or before the process of fitting the intermediate structure 8 and the optical structure 5. By fitting the optical structure 5 after inspecting the characteristics of the device substrate 1, it is possible to prevent the optical structure 5 from being fitted together with a defective device substrate 1, thereby preventing wasteful use of the expensive optical structure 5.

Embodiment 3

Figure 9:
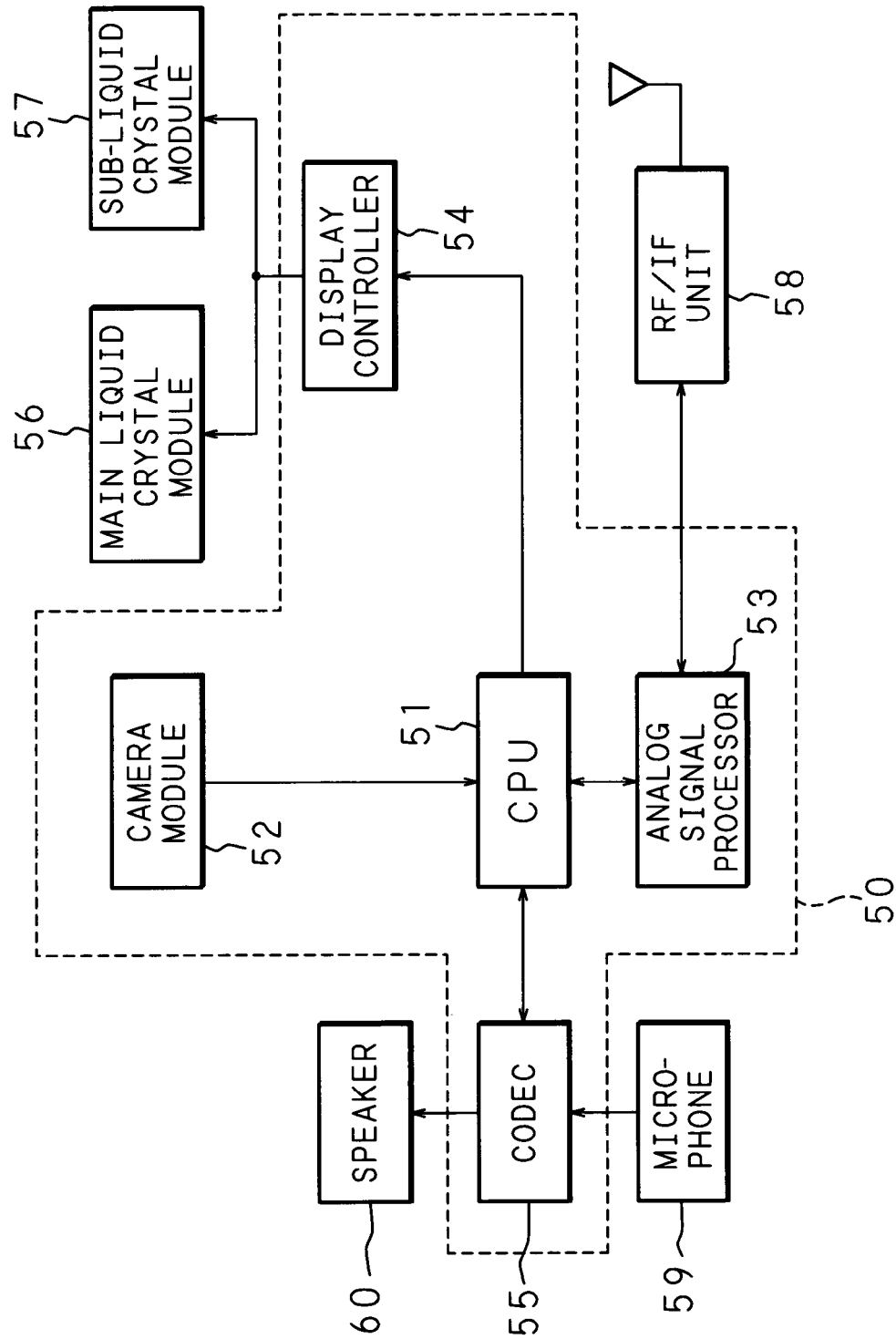
FIG. 9 is a schematic block diagram of an electronic apparatus according to Embodiment 3.

FIG. 9 is a schematic block diagram of an electronic apparatus according to Embodiment 3 of the present invention. Since Embodiment 3 is an electronic apparatus comprising a camera module of Embodiment 1, it is possible to provide an electronic apparatus having the characteristics of the camera module of Embodiment 1. The electronic apparatus is a mobile phone, for example, and comprises an apparatus substrate (mother board) 50. The apparatus substrate 50 is made of a glass epoxy resin or the like, and has a suitable wiring pattern formed thereon. Disposed on the apparatus substrate 50 are circuit components, such as a CPU 51 that is a central processing unit functioning as a controller when executing various control operations, a camera module 52 (camera module of Embodiment 1), an analog signal processor 53, a display controller 54, and a codec 55. When mounting these circuit components on the apparatus substrate 50, the circuit components are positioned appropriately on the apparatus substrate 50 and then soldered by reflow soldering. Note that this embodiment merely shows one example of the arrangement of the circuit components on the apparatus substrate 50, and thus the arrangement of the circuit components is not limited to this example.

A main liquid crystal module 56, a sub-liquid crystal module 57, a RF/IF unit (Radio Frequency/Intermediate Frequency unit) 58, a microphone 59, a speaker 60, etc. which are necessary to function as a mobile phone are disposed on the periphery of the apparatus substrate 50, and connected to the apparatus substrate 50.

In this embodiment, after correctly positioning the apparatus substrate 50 and the device substrate 1 with respect to each other, they are electrically connected. More specifically, a connection terminal (not shown) formed on the apparatus substrate 50 and the connection terminal section 23 of the device substrate 1 are correctly positioned with respect to each other and connected by reflow soldering. The coil terminal 18 is extended to the coil connection terminal section 22, and the coil connection terminal section 22 is formed in the same fashion as the connection terminal section 23 of a leadless chip carrier type substrate, and therefore the coil terminal 18 can be simultaneously connected to both the coil connection terminal section 22 and the connection terminal of the apparatus substrate 50 when performing the reflow soldering.

Embodiment 4

Embodiment 4 is a manufacturing method of an electronic apparatus according to Embodiment 3. More specifically, Embodiment 4 is a method of manufacturing an electronic apparatus by connecting to an apparatus substrate a camera module comprising an optical structure 5 having a coil 15 for adjusting the focal point of a lens system 6, a device substrate 1 on which a solid-state image pickup device 2 is mounted to correspond to the lens system 6, an intermediate structure 8 disposed between the optical structure 5 and the device substrate 1, and a coil terminal 18 taken out from a side face of the optical structure 5 and extended along a side face of the intermediate structure 8 to a connection terminal section 23 formed in the device substrate 1.

The manufacturing method of an electronic apparatus according to this embodiment comprises the process of fixing the intermediate structure 8 to the device substrate 1 on the outer periphery of the solid-state image pickup device 2 after mounting the solid-state image pickup device 2 on the device substrate 1, the process of fitting the intermediate structure 8 and the optical structure 5, and the process of connecting the coil terminal 18 to the coil connection terminal section 22 and a connection terminal (not shown) of the apparatus substrate 50 by electrically connecting the coil connection terminal section 22 and connection terminal section 23 of the device substrate 1 and the connection terminal of the apparatus substrate 50 after correctly positioning the device substrate 1 and the apparatus substrate 50 with respect to each other. It is possible to electrically connect the coil terminal 18 and the apparatus substrate 50 when electrically connecting the device substrate 1 and the apparatus substrate 50, it is not necessary to perform an additional process for connecting the coil terminal 18, it is possible to simplify the coil terminal connection process, it is possible to simplify the manufacture of the electronic apparatus, and it is possible to reduce the cost.

Note that exemplary embodiment presented herein is not limited to the above-described embodiments. For instance, although the above-described embodiments explain the holding projecting sections 24 formed on the intermediate structure 8 as the fitting sections 9 and 10, it may also be possible to form similar holding projecting sections on the optical structure 5. In this case, notched portions similar to the notched portions 25 formed in the optical structure 5 need to be formed in the intermediate structure 8. Moreover, it is not necessarily to provide the intermediate structure if it is provided for the purpose of connecting the coil terminal to the apparatus substrate (mother board) of an electronic apparatus simultaneously when connecting the connection terminal section of the device substrate to the apparatus substrate by soldering or other technique.

As this invention may be embodied in several forms without departing from the spirit of essential characteristics thereof, the present embodiments are therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

The invention claimed is:

1. A camera module comprising:
an optical structure capable of adjusting a focal point of a lens system;
a device substrate on which a solid-state image pickup device is mounted to correspond to the lens system;
an intermediate structure disposed between the optical structure and the device substrate, and
a coil terminal extended along a side face of the optical structure to a coil connection terminal section formed in the device substrate,
wherein at least one of the optical structure and the intermediate structure has a fitting section for fitting the other structure, and
the coil connection terminal section corresponding to the coil terminal has a larger area than other connection terminal section formed in the device substrate.

2. The camera module according to claim 1, wherein the intermediate structure is fixed to the device substrate.

3. The camera module according to claim 1, wherein the fitting section is provided in at least two positions.

4. The camera module according to claim 1, wherein fitting sections in at least two positions among the fitting sections are holding projecting sections that project from one structure having the fitting sections so as to hold the optical structure.

5. The camera module according to claim 4, wherein the other structure has notched portions corresponding to the holding projecting sections.

6. The camera module according to claim 5, wherein the holding projecting section has a fitting pawl.

7. The camera module according to claim 5, wherein an outer shape of the optical structure seen from a light incident side of the lens system is rectangular, and the optical structure has the holding projecting sections, or the notched portions corresponding to the holding projecting sections, at positions biased to corners of the rectangular shape.

8. The camera module according to claim 1, wherein the device substrate is a leadless chip carrier substrate.

9. The camera module according to claim 1, wherein the optical structure has a projecting section projecting toward the intermediate structure, and the intermediate structure has a notched portion corresponding to the projecting section of the optical structure.

10. The camera module according to claim 9, wherein the fitting projecting section of the optical structure has a fitting pawl.

11. The camera module according to claim 9, further comprising:
a coil incorporated in the optical structure to adjust the focal point of the lens system; and
a coil terminal drawn from the coil and extended along the projecting section of the optical structure to a coil connection terminal section formed in the device substrate.

12. A camera module comprising:
an optical structure having a coil for adjusting a focal point of a lens system;
a device substrate on which a solid-state image pickup device is mounted to correspond to the lens system; and
a coil terminal extended along a side face of the optical structure to a coil connection terminal section formed in the device substrate, wherein
the coil connection terminal section corresponding to the coil terminal has a larger area than other connection terminal section formed in the device substrate.

13. The camera module according to claim 12, wherein at least one of the optical structure and the intermediate structure has holding projecting sections which are formed at two positions so as to hold the other structure.

14. The camera module according to claim 13, wherein the other structure has notched portions corresponding to the holding projecting sections.

15. The camera module according to claim 12, further comprising an image signal processing circuit mounted on the device substrate,
wherein the coil connection terminal section corresponding to the coil terminal is positioned on an opposite side to a mount position of the image signal processing circuit.

16. The camera module according to claim 12, wherein the device electric substrate is a leadless chip carrier substrate.

17. The camera module according to claim 12, further comprising an intermediate structure disposed between the optical structure and the device substrate,
wherein the optical structure has a projecting section projecting toward the intermediate structure, and the coil terminal is placed along the projecting section of the optical structure.

18. The camera module according to claim 17, wherein the intermediate structure has a notched portion corresponding to the projecting section.

19. An electronic apparatus comprising:
a camera module mounted on an apparatus substrate, said camera module further comprising:
- an optical structure capable of adjusting a focal point of a lens system;
- a device substrate on which a solid-state image pickup device is mounted to correspond to the lens system; and
- an intermediate structure disposed between the optical structure and the device substrate, and
a coil terminal extended along a side face of the optical structure to a coil connection terminal section formed in the device substrate,
  wherein at least one of the optical structure and the intermediate structure has a fitting section for fitting the other structure, and
  the coil connection terminal section corresponding to the coil terminal has a larger area than other connection terminal section formed in the device substrate.

20. An electronic apparatus comprising:
a camera module mounted on an apparatus substrate, said camera module further comprising:
- an optical structure having a coil for adjusting a focal point of a lens system;
- a device substrate on which a solid-state image pickup device is mounted to correspond to the lens system; and
- a coil terminal extended along a side face of the optical structure to a coil connection terminal section formed in the device substrate, wherein
the coil connection terminal section corresponding to the coil terminal has a larger area than other connection terminal section formed in the device substrate.

21. A manufacturing method of a camera module comprising an optical structure capable of adjusting a focal point of a lens system, a device substrate on which a solid-state image pickup device is mounted to correspond to the lens system, and an intermediate structure disposed between the optical structure and the device substrate, and a coil terminal extended along a side face of the optical structure to a coil connection terminal section formed in the device substrate,
said method comprising:
  mounting the solid-state image pickup device on the device substrate;
  fixing the intermediate structure to the device substrate on an outer periphery of the solid-state image pickup device after said mounting the solid-state image pickup device on the device substrate; and
  fitting the intermediate structure and the optical structure, wherein
  the coil connection terminal section corresponding to the coil terminal has a larger area than other connection terminal section formed in the device substrate.

22. The manufacturing method of a camera module according to claim 21, further comprising
  inspecting characteristics of the camera module by supplying a predetermined signal to a connection terminal section of the device substrate in a state in which the intermediate structure and the optical structure are fitted, and supplying a coil current to the coil terminal drawn from the coil incorporated in the optical structure to adjust the focal point of the lens system and extended to the coil connection terminal section.

23. The manufacturing method of a camera module according to claim 21, further comprising
  inspecting characteristics of the device substrate on which the solid-state image pickup device is mounted, before said fixing the intermediate structure to the device substrate or said fitting the intermediate structure and the optical structure.

24. A manufacturing method of an electronic apparatus by connecting to an apparatus substrate a camera module comprising an optical structure having a coil for adjusting a focal point of a lens system, a device substrate on which a solid-state image pickup device is mounted to correspond to the lens system, an intermediate structure disposed between the optical structure and the device substrate, and a coil terminal taken out from a side face of the optical structure and extended along a side face of the intermediate structure to a coil connection terminal section formed in the device substrate, said method comprising:
  mounting the solid-state image pickup device on the device substrate;
  fixing the intermediate structure to the device substrate on an outer periphery of the solid-state image pickup device after said mounting the solid-state image pickup device on the device substrate;
  fitting the intermediate structure and the optical structure;
  correctly positioning the device substrate and the apparatus substrate with respect to each other; and
  connecting the coil terminal to the coil connection terminal section and the apparatus substrate by electrically connecting the device substrate and the apparatus substrate after correctly positioning the device substrate and the apparatus substrate with respect to each other,
wherein
the coil connection terminal section corresponding to the coil terminal has a larger area than other connection terminal section formed in the device substrate.

* * * * *